US006680443B2

United States Patent
Dixon

(10) Patent No.: US 6,680,443 B2
(45) Date of Patent: Jan. 20, 2004

(54) LOAD CELL APPARATUS HAVING A GAP MEASURING DEVICE

(75) Inventor: Steven A. Dixon, Cin, OH (US)

(73) Assignee: Hill-Rom Services, Inc., Batesville, IN (US)

( * ) Notice: Subject to any disclaimer, the term of this patent is extended or adjusted under 35 U.S.C. 154(b) by 0 days.

(21) Appl. No.: 10/174,913

(22) Filed: Jun. 19, 2002

(65) Prior Publication Data

US 2003/0000746 A1 Jan. 2, 2003

Related U.S. Application Data

(60) Provisional application No. 60/300,142, filed on Jun. 22, 2001.

(51) Int. Cl.$^7$ .......................... G01G 19/52; G01G 3/12; G01G 9/00
(52) U.S. Cl. ..................... 177/144; 177/210 R; 177/229
(58) Field of Search ............................. 177/144, 210 R, 177/210 C, 211, 210 EM, 229, DIG. 9

(56) References Cited

U.S. PATENT DOCUMENTS 3,217,818 A    11/1965   Engelsher et al. .......... 177/208
3,741,328 A    6/1973    Andersson et al. ...... 177/210 R
4,015,677 A    4/1977    Silva et al. ................. 177/165

(List continued on next page.)

FOREIGN PATENT DOCUMENTS

EP      0744598 B1      11/2001
WO      WO 01/23847 A1   4/2001

OTHER PUBLICATIONS

"Linear proximity Sensing Technology", 3 pages, 2001 MTS Systems Corporation.

G. Ulbers, Integrated-optical sensors for the measurement of displacement, force and refractive index on the basis of silicon, 8008 Technisches Messen 58 (1991), Apr., No. 4, pp. 146–151.

*Primary Examiner*—Randy Gibson
(74) *Attorney, Agent, or Firm*—Barnes & Thornburg

(57) ABSTRACT

A load cell apparatus for use with a structure comprises a cell block that flexes in response to an applied load and a transducer that is adapted to measure a distance across a gap. In some embodiments, the gap is defined between the transducer and the structure, and in other embodiments, the gap is defined between the transducer and the cell block.

32 Claims, 7 Drawing Sheets

U.S. PATENT DOCUMENTS

| | | | |
|---|---|---|---|
| D248,928 S | 8/1978 | Grunstad | D10/91 |
| 4,134,467 A | 1/1979 | Czyryk | 177/133 |
| 4,286,679 A | 9/1981 | Schneider | 177/132 |
| 4,363,368 A | 12/1982 | Paddon et al. | 177/144 |
| 4,411,327 A | 10/1983 | Lockery et al. | 177/211 |
| 4,540,057 A | 9/1985 | Freeman | 177/154 |
| 4,554,987 A | 11/1985 | Dillon | 177/134 |
| 4,572,006 A * | 2/1986 | Wolfendale | 177/210 C |
| 4,600,066 A | 7/1986 | Griffen et al. | 177/211 |
| 4,623,029 A * | 11/1986 | Bambauer et al. | 177/210 R |
| 4,649,759 A * | 3/1987 | Lee | 177/210 C |
| 4,738,325 A * | 4/1988 | Bullivant et al. | 177/210 EM |
| 4,763,740 A * | 8/1988 | Pattern | 177/210 R |
| 4,793,428 A * | 12/1988 | Swersey | 177/144 |
| 4,899,600 A * | 2/1990 | Lee | 177/210 C |
| 4,926,951 A | 5/1990 | Carruth et al. | 177/144 |
| 4,934,468 A | 6/1990 | Koerber, Sr. et al. | 177/144 |
| 4,953,244 A | 9/1990 | Koerber, Sr. et al. | 5/60 |
| 4,961,470 A | 10/1990 | Koerber, Sr. | 177/144 |
| 4,974,692 A | 12/1990 | Carruth et al. | 177/144 |
| 5,183,126 A | 2/1993 | Kellenbach | 177/211 |
| 5,224,561 A | 7/1993 | Ahl | 177/163 |
| 5,269,388 A | 12/1993 | Reichow et al. | 177/144 |
| 5,359,902 A * | 11/1994 | Barger et al. | 73/862.626 |
| 5,545,984 A | 8/1996 | Gloden et al. | 324/207.13 |
| 5,672,849 A | 9/1997 | Foster et al. | 177/144 |
| 5,801,339 A | 9/1998 | Boult | 177/261 |
| 5,827,981 A * | 10/1998 | March | 73/862.642 |
| 5,831,221 A | 11/1998 | Geringer et al. | 177/144 |
| 5,859,390 A | 1/1999 | Stafford et al. | 177/144 |
| 5,864,295 A * | 1/1999 | Jarocha | 177/210 R |
| 5,910,647 A * | 6/1999 | Kats et al. | 177/210 FP |
| 5,988,676 A * | 11/1999 | Lotito et al. | 280/735 |
| 6,026,694 A | 2/2000 | Gray | 73/862.68 |
| 6,166,336 A * | 12/2000 | Odiet | 177/210 R |
| 6,208,250 B1 | 3/2001 | Dixon et al. | 340/573.1 |
| 6,320,510 B2 | 11/2001 | Menkedick et al. | 340/573.1 |
| 6,321,878 B1 | 11/2001 | Mobley et al. | 188/1.12 |
| 6,362,439 B1 | 3/2002 | Reichow | 177/144 |
| 6,438,776 B2 | 8/2002 | Ferrand et al. | 5/600 |

\* cited by examiner

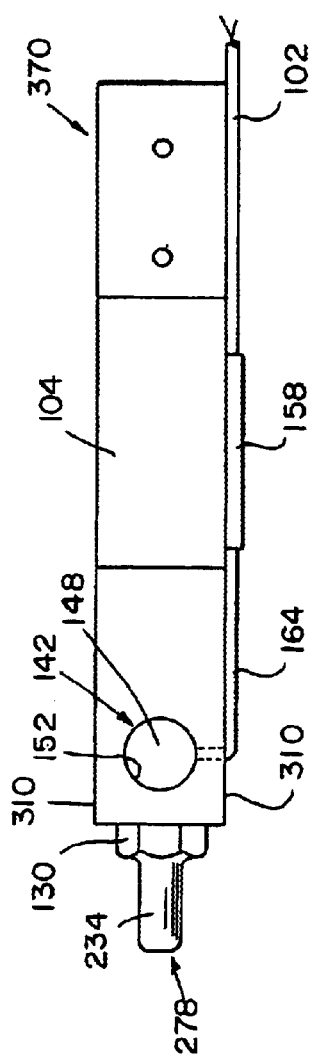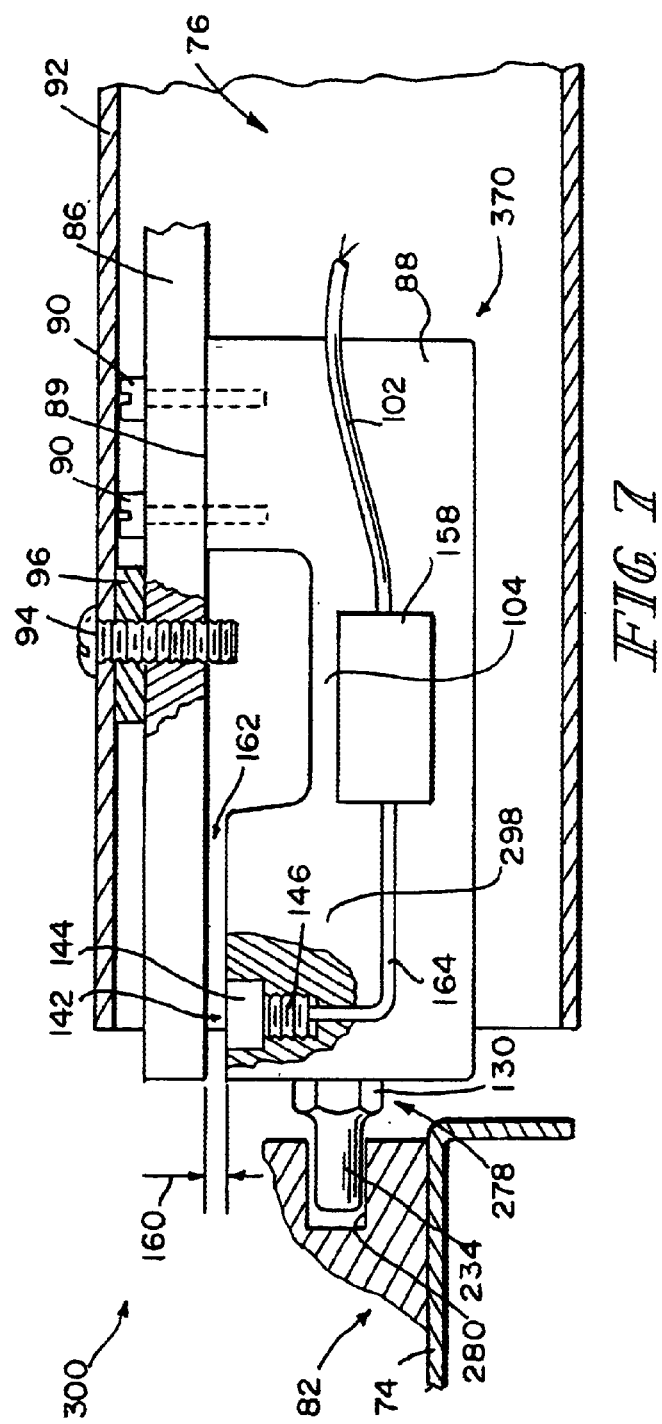

us6,680,443 B2

LOAD CELL APPARATUS HAVING A GAP MEASURING DEVICE

CROSS-REFERENCE TO A RELATED APPLICATION

This application claims the benefit of U.S. Provisional Patent Application Ser. No. 60/300,142, filed Jun. 22, 2001, the complete disclosure of which is hereby incorporated by reference herein.

BACKGROUND AND SUMMARY OF THE INVENTION

The present disclosure relates to load cells and particularly, to load cells that generate signals indicative of loads applied to the load cells. More particularly the present disclosure relates to a load cell apparatus having a gap measuring device.

It is well known to use load cells to sense loads. Some conventional load cells include a block (also known as a load beam) and one or more strain gages mounted to the block. Deflection of the block due to an applied load changes the shape of the strain gages resulting in a change in the resistance of the strain gages. Generally, a known input voltage is applied to the strain gages and an output signal from the strain gages varies as the resistance of the strain gages vary to provide a signal indicative of the load applied to the load cell. Some conventional load cells include other types of sensors, such as optical sensors and capacitive sensors, rather than strain gages, that measure the size of gaps between elements of a load cell system. It is desirable, of course, for load cells to sense applied loads with a high degree of accuracy and repeatability.

According to the present disclosure, a load cell apparatus for use with a structure includes a cell block that deflects in response to an applied load. The load cell apparatus further includes a transducer coupled to the cell block. The transducer is adapted to measure a distance across a gap defined between the transducer and the structure.

In some embodiments, the transducer emits electromagnetic energy toward a target surface. The transducer of some of these embodiments uses shaped electromagnetic field technology to measure the distance across the gap. In some embodiments, the structure to which the load cell apparatus is coupled comprises a mounting bar which, in turn, is adapted to be coupled to another structure. In such embodiments, the cell block is coupled to the mounting bar and the gap is defined between the transducer and the mounting bar. In other embodiments, the cell block is adapted to couple to a structure and the transducer is coupled to the structure rather than the cell block. In such embodiments, the gap is defined between the transducer and the cell block.

In some embodiments, the load cell apparatus includes a stud extending from a movable portion of the cell block. In such embodiments, the cell block couples to a first structure and the stud engages a mount that is coupled to a second structure. In illustrative embodiments, the stud extends from a first planar face of an end portion of the cell block and the transducer includes an end face that is substantially coplanar with a second planar face of the end portion of the cell block. In such illustrative embodiments, the first planar face is perpendicular to the second planar face.

Also according to the present disclosure, a load cell apparatus includes a cell block supported with respect to a structure. The cell block includes a movable portion that is spaced apart from the structure such that a gap is defined between the movable portion and the structure. The load cell apparatus includes a transducer that is configured to measure a distance across the gap. The movable portion moves and the distance changes in response to a load being applied to the movable portion. In some embodiments, the transducer is coupled to the cell block and in other embodiments, the transducer is coupled to the structure.

Further according to the present disclosure, a load cell apparatus includes two elements defining a gap therebetween. At least one of the elements is deflectable under a load to vary the gap. The load cell apparatus includes a transducer for measuring the gap change in response to the load.

In illustrative embodiments, an electric circuit is coupled to the transducer to receive an output signal from the transducer. The output signal from the transducer is indicative of the distance across the gap and the load applied to the load cell. In the embodiments in which the transducer emits electromagnetic energy toward a target surface, including those embodiments using shaped electromagnetic field technology, the electric circuit provides an input signal to the transducer to generate the electromagnetic energy. In some embodiments, the electromagnetic energy is generated in pulses. In some embodiments, the electric circuit is mounted to the cell block and in other embodiments the electric circuit is mounted to a structure other than the cell block.

Additional features and advantages of the invention will become apparent to those skilled in the art upon consideration of the following detailed description of illustrated embodiments exemplifying the best mode of carrying out the invention as presently perceived.

BRIEF DESCRIPTION OF THE DRAWINGS

The detailed description particularly refers to the accompanying figures in which:

FIG. 7 is a partial sectional view similar to FIG. 6 showing a gap between the top end face of the transducer and the underside of the mounting bar and showing a second alternative embodiment mounting member having a bore that receives the cylindrical stud;

FIG. 8 is a top view of the cell block and transducer of FIG. 6; and

DETAILED DESCRIPTION OF THE DRAWINGS

The present disclosure relates to load cell apparatus which will be described herein as used in a weigh system of a hospital bed. However, the various load cell apparatus disclosed herein are not limited to use in hospital beds and those skilled in the art will appreciate that the various load cell apparatus in accordance with this disclosure may be used in a wide variety of applications where loads are sensed.

Figure 1:
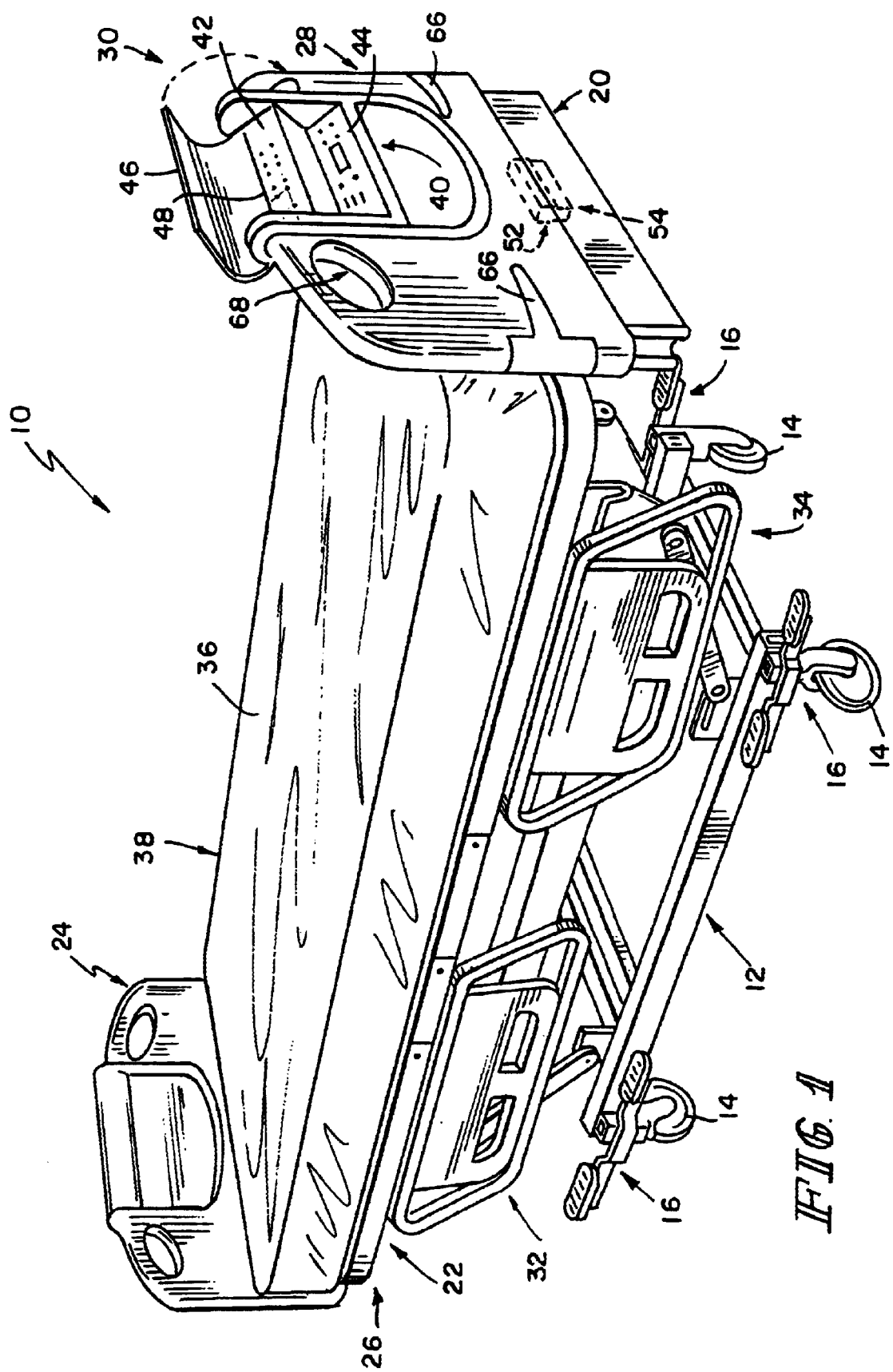
FIG. 1 is a perspective view of a hospital bed having a weigh system including load cell apparatus constructed in accordance with the present disclosure.
Figure 2:
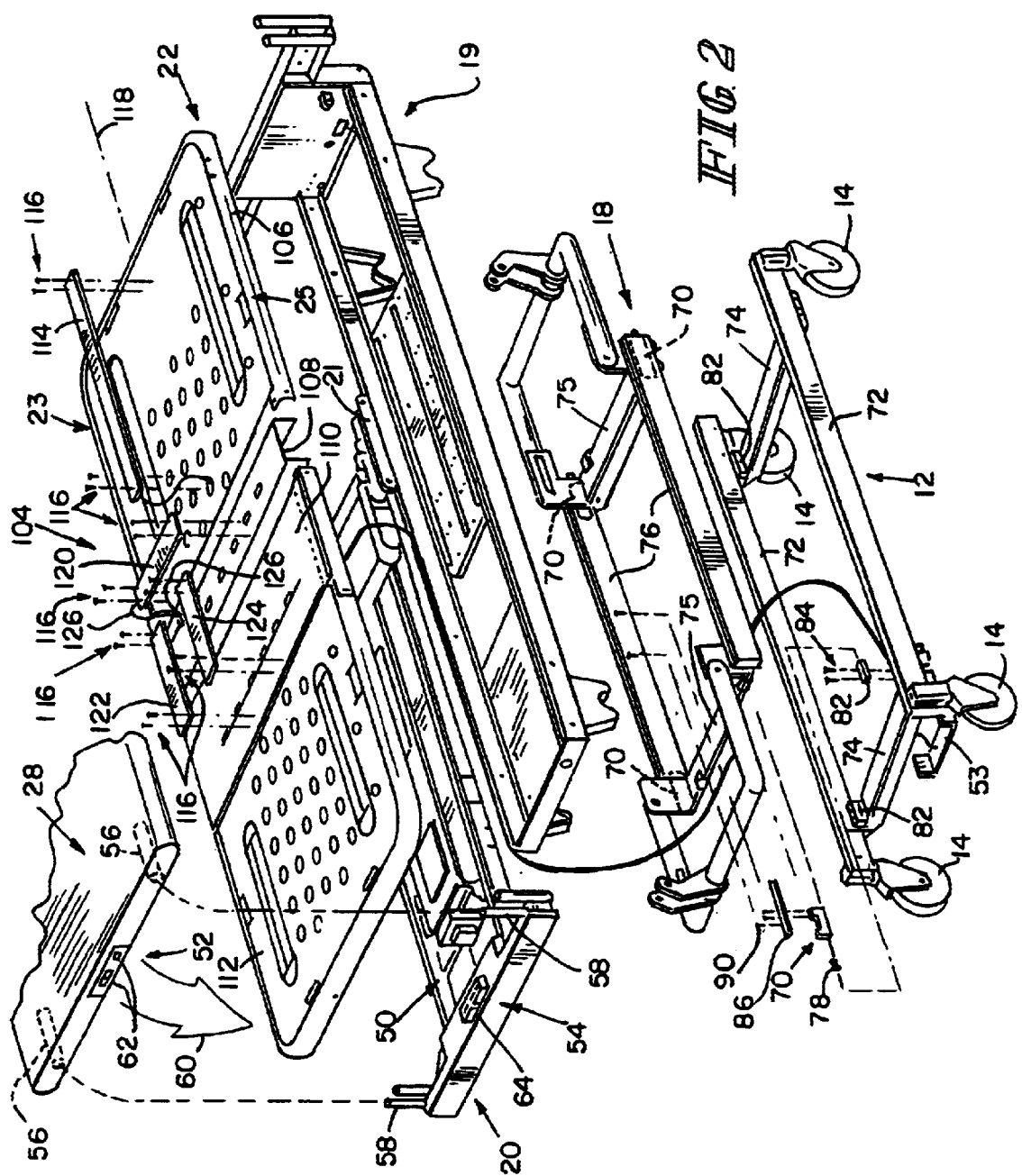
FIG. 2 is an exploded perspective view of portions of the hospital bed of FIG. 1 showing a base frame with casters mounted thereto, a weigh frame above the base frame, an intermediate frame above the weigh frame, a retracting frame above the intermediate frame, and an articulating deck above the retracting frame.

A hospital bed 10 includes a base frame 12 to which a plurality of casters 14 are coupled as shown in FIG. 1. Illustrative bed 10 also includes brake/steer control pedals 16 coupled to base frame 12 adjacent respective casters 14. As best shown in FIG. 2, bed 10 includes a weigh frame 18 coupled to base frame 12, an intermediate frame 19 coupled to the weigh frame 18, a retracting frame 20 coupled to the intermediate frame 19, and an articulating deck 22 coupled to the intermediate frame 19 and to the retracting frame 20. Deck 22 includes a head section 106, a seat section 108, a thigh section 110, and a foot section 112. Brackets 21 on opposite sides of frame 20 are configured to be coupled between the head section 106 and the thigh section 110 of deck 22 with suitable fasteners (not shown).

Bed 10 includes a headboard 24 mounted adjacent a head end 26 of bed 10 and a footboard 28 mounted to frame 20 adjacent a foot end 30 of bed 10 as shown in FIG. 1. Bed 10 further includes a pair of head end siderails 32 and a pair of foot end siderails 34 mounted to the articulating deck 22 on opposite sides of bed 10. Side rails 32, 34 are movable from a lowered position shown in FIG. 1 to an elevated position (not shown) located above a top surface 36 of a mattress 38 that is supported by deck 22.

Controls for controlling various functions of bed 10 are included in siderails 32 and in footboard 28. Illustrative controls 40 are located on a top inclined panel 42 and bottom inclined panel 44 on the footboard 28. A cover 46 is pivotably coupled to the footboard 28 for movement between a raised position, shown in FIG. 1, exposing panel 42 and a lowered position (not shown) concealing panel 42. Footboard 28 also includes side bumpers 66 and hand grip apertures 68.

Controls 40 on footboard 28 are electrically coupled to a controller 50 shown in FIG. 2. Controller 50 and other bed electronics are illustratively mounted on frame 20. Signals from controls 40 route to controller 50 through a connector 52 that is coupled to footboard 28 and also route through a connector 54 that is coupled to frame 20. Connector 52 disconnects from connector 54 when the footboard 28 is removed from frame 20 as shown in FIG. 2. Footboard 28 is formed to include apertures 56 that slide over posts 58 on frame 20 during installation of footboard 28 on frame 20 in the direction of arrow 60 in FIG. 2.

Additional details of bed 10 are disclosed in U.S. Pat. No. 6,208,250 entitled PATIENT POSITION DETECTION APPARATUS FOR A BED and in U.S. Pat. No. 6,321,878 entitled CASTER AND BRAKING SYSTEM, each of which are assigned to the assignee of the present invention and each of which are hereby incorporated by reference herein. As mentioned above, the details of bed 10 are given only to provide a description of one type of application in which the load cell apparatus of the present disclosure may be used and such details are not intended to limit the scope of the claims in any manner.

Controls 40 on lower panel 44 include controls for operating a weigh system of bed 10. The weigh system includes load cell apparatus 100 in accordance with the present disclosure. The weigh system also includes patient-position sensors 114, 120, 122, 124 coupled to deck 22 by suitable fasteners 116 as shown in FIG. 2. Further details of sensors 114, 120, 122, 124 are provided in U.S. Pat. No. 6,208,250.

Weigh frame 18 and the portions of bed 10 thereabove are supported relative to base frame 12 by the load cell apparatus 100. Base frame 12 includes side frame members 72 and transverse frame members 74 extending between side frame members 72 as shown, for example, in FIG. 3. Weigh frame 18 includes a pair of hollow side frame members 76 and a pair of transverse frame members 75 extending between side frame members 76.

The description below of a single load cell apparatus 100 used in bed 10 is descriptive of all of the load cell apparatus 100 used in bed 10 unless specifically noted otherwise. Load cell apparatus 100 includes a load member, load beam, or cell block that is mounted at one of the four corners of the weigh frame 18. The term "cell block" as used herein, including in the claims, is intended to cover all types of load members, load beams, and load cells. The size and shape of cell blocks are generally tailored to the specific applications in which they are used. In many instances, designers will attempt to design cell blocks so that their force v. deflection characteristics are as close to linear as possible, at least within some range of applied loads. However, it should be understood that the term "cell block" in this disclosure, including in the claims, is intended to cover masses of material that have force v. deflection characteristics of all types, including linear or nonlinear force v. deflection characteristics.

A proximity sensor or transducer 142 is included in load cell apparatus 100 and, in the embodiments shown in FIGS. 3–7, is coupled to cell block 70. Transducer 142 operates to provide an output signal that correlates to the load supported by the load cell apparatus 100.

Figure 3:
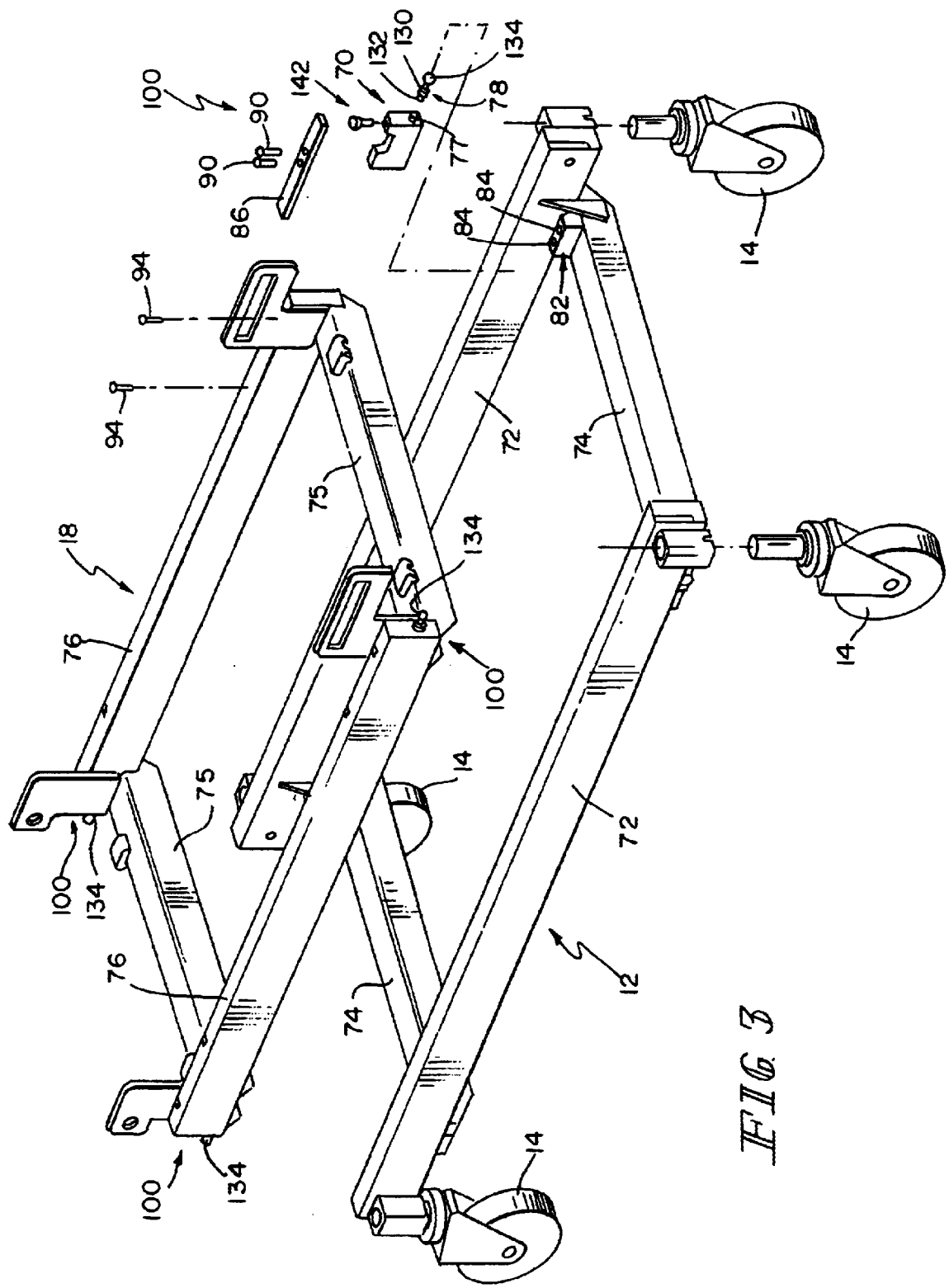
FIG. 3 is an exploded perspective view of the base frame and weigh frame of FIG. 2 showing, on the right hand side of the page, a load cell apparatus including an elongated mounting bar arranged for coupling to the weigh frame, a cell block beneath the mounting bar, a transducer situated between the mounting bar and the cell block, a stud adjacent the cell block, and a mounting member coupled to the base frame.
Figure 4:
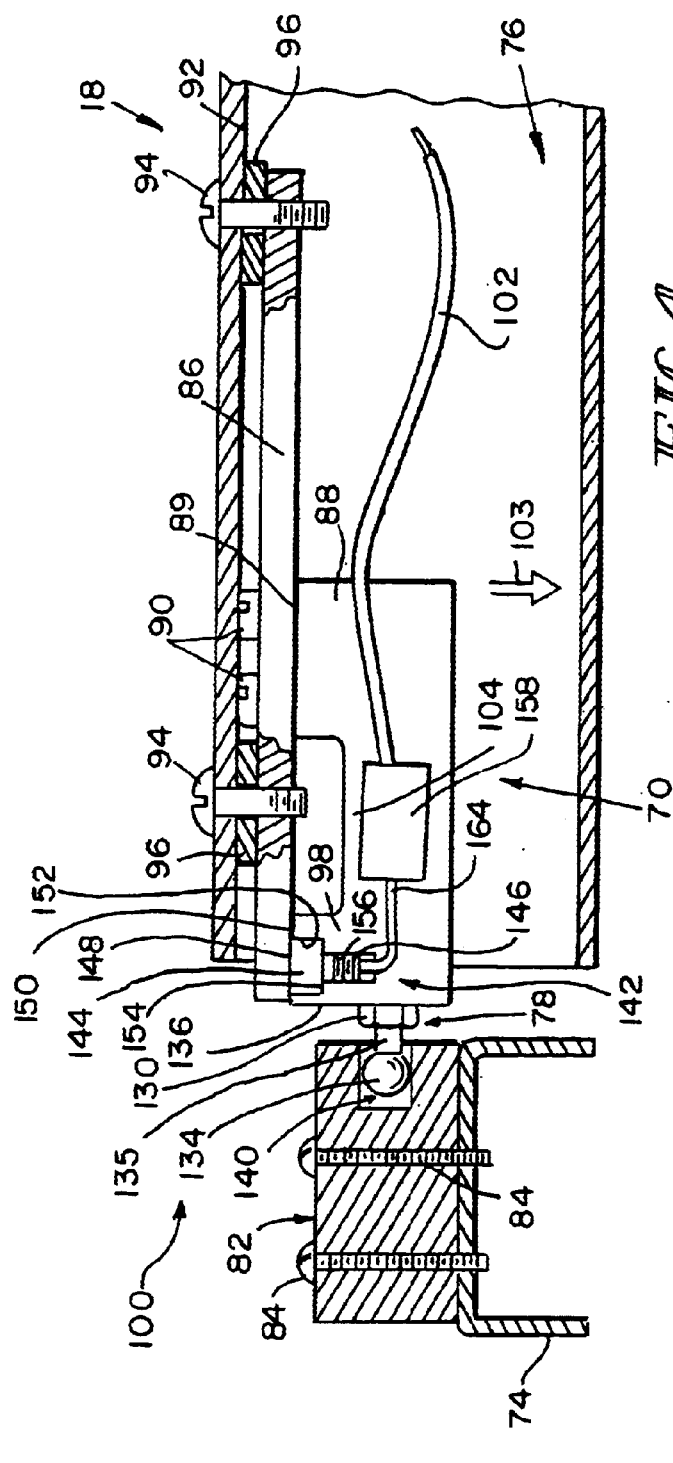
FIG. 4 is a partial sectional view of the base frame, the weigh frame, and the load cell apparatus showing the stud having a spherical portion that is received in a bore formed in the mounting member and a top end face of the transducer confronting an underside of the mounting bar.
Figure 5:
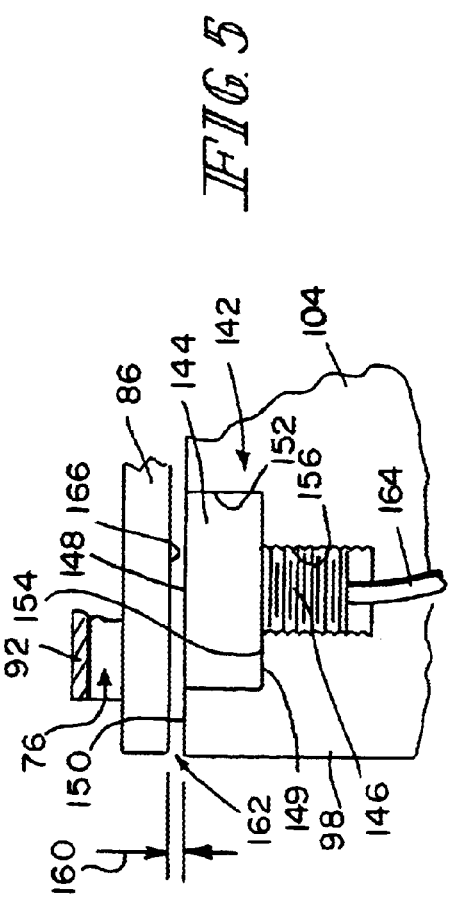
FIG. 5 is an enlarged, partial sectional view of a portion of the load cell apparatus of FIG. 4.

Cell block 70 of load cell apparatus 100 includes a first portion 88 having a planar surface 89, shown in FIG. 4, that abuts mounting bar 86, a second portion 98 that is spaced from mounting bar 86 by a distance 160, shown in FIG. 5, and a reduced-thickness portion 104 interconnecting portions 88, 98. Thus, a gap 162 is defined between the transducer 142 and an undersurface 166 of mounting bar 86. In some embodiments, distance 160 is quite small, on the order of about 0.05 inches (0.127 cm). Block 70 is coupled to a mounting member or bar 86 by suitable fasteners such as bolts 90 shown, for example, in FIGS. 2 and 3. Mounting bar 86 and block 70 are received in the interior region of frame member 76 and suitable fasteners, such as bolts 94, fasten mounting bar 86 to a top wall 92 of frame member 76 as shown best in FIG. 5. Spacers 96 are provided between mounting bar 86 and wall 92 to provided adequate clearance for the portion of fasteners 90 located above mounting bar 86. Alternatively, mounting bar 86 is formed with integral, upwardly extending bosses that perform the same function as spacers 96.

Transducer 142 is configured to sense distance 160 across gap 162 and to generate an output signal that corresponds to distance 160. Increasing the weight supported by weigh frame 18 causes portion 88 to move downwardly in the direction of double arrow 103, shown in FIG. 4, thereby causing portion 104 to flex. As portion 104 flexes due to increasing weight, gap 162 closes by a slight amount and distance 160 becomes smaller. As distance 160 across gap 162 changes, the output signal of transducer 142 changes. Load cell apparatus 100 includes an electric circuit 158 that receives the output signal generated by transducer 142 via one or more wires 164. Electric circuit 158 processes the output signal and provides, via one or more wires 102, a processed signal that correlates to the distance across gap 162 and to the load being applied to cell block 70. The processed signal is fed to circuitry of the weigh system included in controller 50. The weigh system circuitry receives the processed signals from all four load cell apparatus 100 included in bed 10 and calculates the overall weight supported by weigh frame 18.

When a predetermined "maximum" amount of weight is supported by weigh frame 18, mounting bar 86 will contact portion 98 of cell block 70 thereby preventing portion 88 from moving in direction 103 any further even if additional weight beyond the "maximum" amount is added to the weigh frame 18. This feature is well-known in the art and prevents overflexing of portion 104 of cell block 70. In the illustrative embodiments, the maximum amount of weight is about 400 pounds.

Transducer 142 includes a sensing head 144 and a threaded portion 146 extending from sensing head 144 as shown in FIGS. 4 and 5. Sensing head 144 includes an end face 148 that faces away from threaded portion 146. Sensing head 144 is cylindrical or disk-shaped and has a diameter that is larger than the diameter of threaded portion 146. In some alternative embodiments the diameters of the sensing head and the threaded portion are substantially the same, and in other alternative embodiments, the diameter of the threaded portion is larger than the diameter of the sensing head. In further embodiments, sensing head 144 has a shape other than cylindrical or disk-shaped.

Wires 164 extend from sensing head 144 through a passage (not shown) formed in threaded portion 146. Portion 98 of cell block 70 includes a planar surface 150 and a cylindrical bore 152 that is open at planar surface 150. Portion 98 also includes an annular shoulder surface 154 and a threaded bore 156 that is open at shoulder surface 154.

Threaded portion 146 is received in threaded bore 156 to couple transducer 142 to cell block 70. Sensing head 144 is positioned to lie in cylindrical bore 152 so that a back side 149 of sensing head 144 abuts shoulder surface 154 as shown best in FIG. 5. Sensing head 144 has a diameter that is substantially the same as the diameter of cylindrical bore 152. Thus, sensing head 144 substantially fills bore 152. However, a very minimal amount of clearance exists between the cylindrical surface of sensing head 144 and the cylindrical surface of portion 88 that defines bore 152. In some alternative embodiments, a greater amount of clearance is provided between sensing head 144 and portion 88, and in other alternative embodiments, threaded portion 146 is omitted such that sensing head 144 is mounted to block 70 in other ways, such as by press fitting into bore 152 or via suitable couplers such as, for example, adhesive, tabs, fingers, screws, staking, straps, bands, latches, rivets, and so on.

In the illustrative embodiment, wires 164 extend from threaded portion 146 and are routed through one or more passages (not shown) formed in cell block 70. Also in the illustrative embodiment, the depth of cylindrical bore 152 below planar surface 150 is such that end face 148 of sensing head 144 is coplanar with planar surface 150 of portion 98 of cell block 70 when sensing head 144 abuts shoulder surface 154. Alternatively, the depth of cylindrical bore 152 is such that end face 148 of sensing head 144 is recessed or countersunk by a slight amount from planar surface 150. Further alternatively, the depth of cylindrical bore 152 is such that end face 148 of sensing head 144 protrudes by a slight amount beyond planar surface 150. The term "substantially coplanar" as used in the specification and in the claims is intended to cover all of these arrangements. In some alternative embodiments, cylindrical bore 152 is omitted and sensing head 144 is not recessed into cell block.

Sensing head 144 of transducer 142 emits electromagnetic energy in pulses into gap 162 toward an undersurface or target surface 166, which in the illustrative example is a portion of mounting bar 86. Target surface 166 affects the electromagnetic energy which, in turn, affects the output signal of sensing head 144. Electric circuit 158 is configured to provide input signals to excite transducer 142 to generate the electromagnetic energy pulses.

In one embodiment, a stud 78 of load cell apparatus 100 includes a hex nut portion 130, a threaded portion 132 on one side of portion 130, and a spherical portion 134 on the other side of portion 130 as shown in FIG. 3. Stud 78 further includes a connection portion 135, shown in FIG. 4, that couples spherical portion 134 to hex nut portion 130. Portion 132 of stud 76 is threaded into an aperture 77, shown in FIG. 3, formed in block 70 until hex nut portion 130 abuts an end surface 136 of block 70 and spherical portion 134 extends longitudinally away from both block 70 and frame member 76. Load cell apparatus 100 further includes a mounting block, mounting tube, or other suitable mounting structure 82 (hereinafter referred to as "mount 82") that is coupled to a top surface of frame member 74 of base frame 12 by suitable fasteners such as bolts 84 as shown, for example, in FIGS. 2–4. Mount 82 is formed to include a bore 140, shown best in FIG. 4.

In some embodiments, cell block 70, stud 78, and mount 82 are made of a metal material. For example, mount 82 may be made of FC-0208-50 steel and may be zinc plated, cell block 70 may be made of aluminum, and stud 78 may be made of either 4140 C.D.S. steel or 4142 C.D.S. steel. However, it is understood that the material from which cell block 70, stud 78, and mount 82 are made is not limited to those materials listed above but that any material having suitable strength and performance characteristics may be used.

Figure 6:
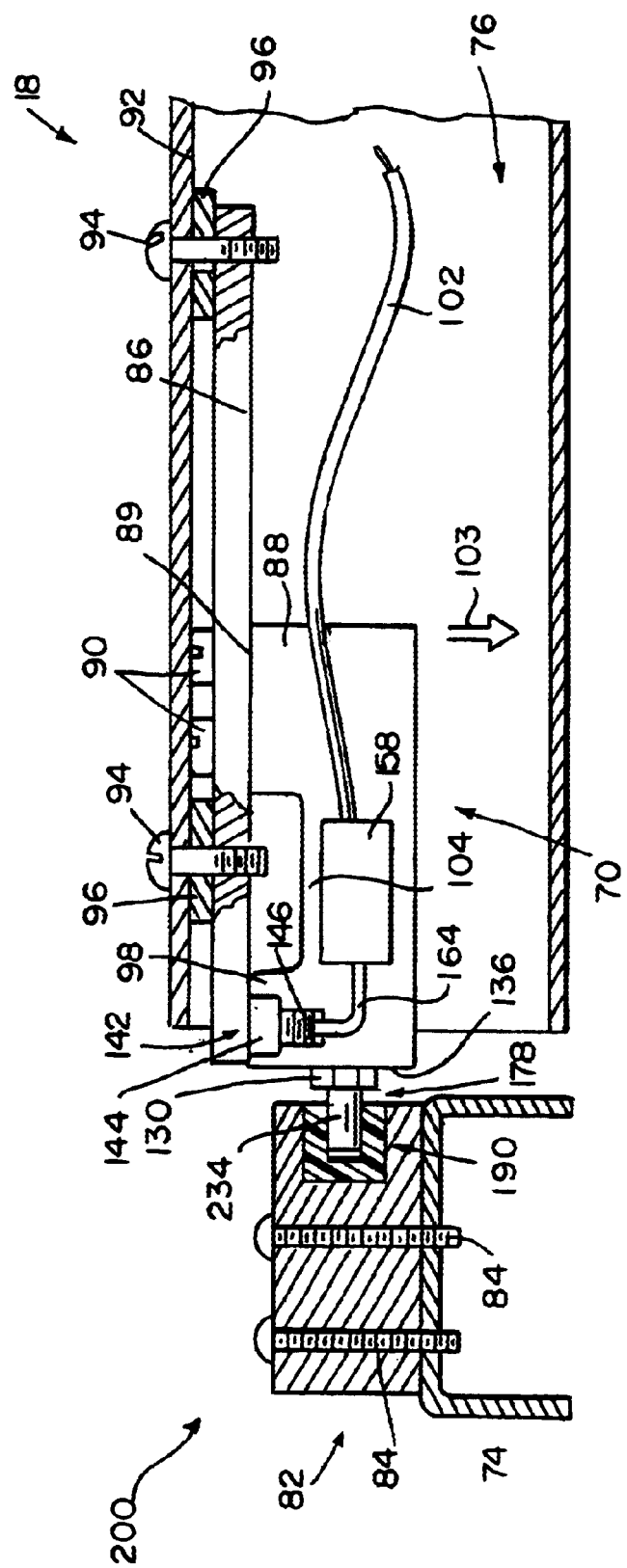
FIG. 6 is a partial sectional view similar to FIG. 4 showing an alternative embodiment stud which is cylindrical and a first alternative embodiment mounting member including a liner having a bore that receives the cylindrical stud.

Portions of a first alternative load cell apparatus 200, shown in FIG. 6, and portions of a second alternative load cell apparatus 300, shown in FIG. 7, are substantially the same as like portions of load cell apparatus 100. Therefore, like reference numerals are used, where appropriate, to denote portions of load cell apparatus 200 and portions of load cell apparatus 300 that are substantially similar to like portions of load cell apparatus 100. Load cell apparatus 200 includes a stud 178 having a cylindrical portion 234 and mount 82 includes a liner 190 that receives cylindrical portion 234. Details of liner 190 and alternative liners, as well as alternative studs, are described in detail in U.S. patent application Ser. No. 09/669,707 which is titled LOAD CELL APPARATUS and which is hereby incorporated by reference herein.

Load cell apparatus 300 includes a stud 278 having a cylindrical portion 234, as was the case with stud 178 of load cell apparatus 200, but mount 82 of load cell apparatus 300 does not have any liner of the type included in load cell apparatus 200. Thus, cylindrical portion 234 of stud 278 rests upon a bore surface 280 of mount 82 of load cell apparatus 300 as shown in FIG. 7. Load cell apparatus 300 includes a cell block 370 having a portion 298 that is longer than portion 98 of cell block 70. As shown in FIG. 8, transducer 144 is positioned about halfway between planar side surfaces 310 of cell block 370.

In some embodiments, transducer 142 is not coupled to a cell block but, rather, is coupled to some other structure. For example, a load cell apparatus 400, shown in FIG. 9, includes a cell block 470 having a first portion 488 that couples to a structure 476 with suitable fasteners 490, a second portion 498 spaced apart from first portion 488, and a reduced-thickness portion 504 interconnecting first and second portions 488, 498. Second portion 498 includes a planar surface 466 that confronts end face 148 of transducer 142. However, surface 466 is spaced apart from end face 148 by distance 160. Thus, gap 162 exists between surface 466 and transducer 142. Surface 466 provides a target surface toward which electromagnetic energy is emitted from transducer 142. Application of a load to portion 498, as indicated by arrow 500, causes portion 504 to deflect and causes portion 498 to move toward transducer 142 to close gap 162. Transducer 142, of course, operates to create an output signal that is indicative of distance 160 as was the case in the prior disclosed embodiments.

Figure 9:
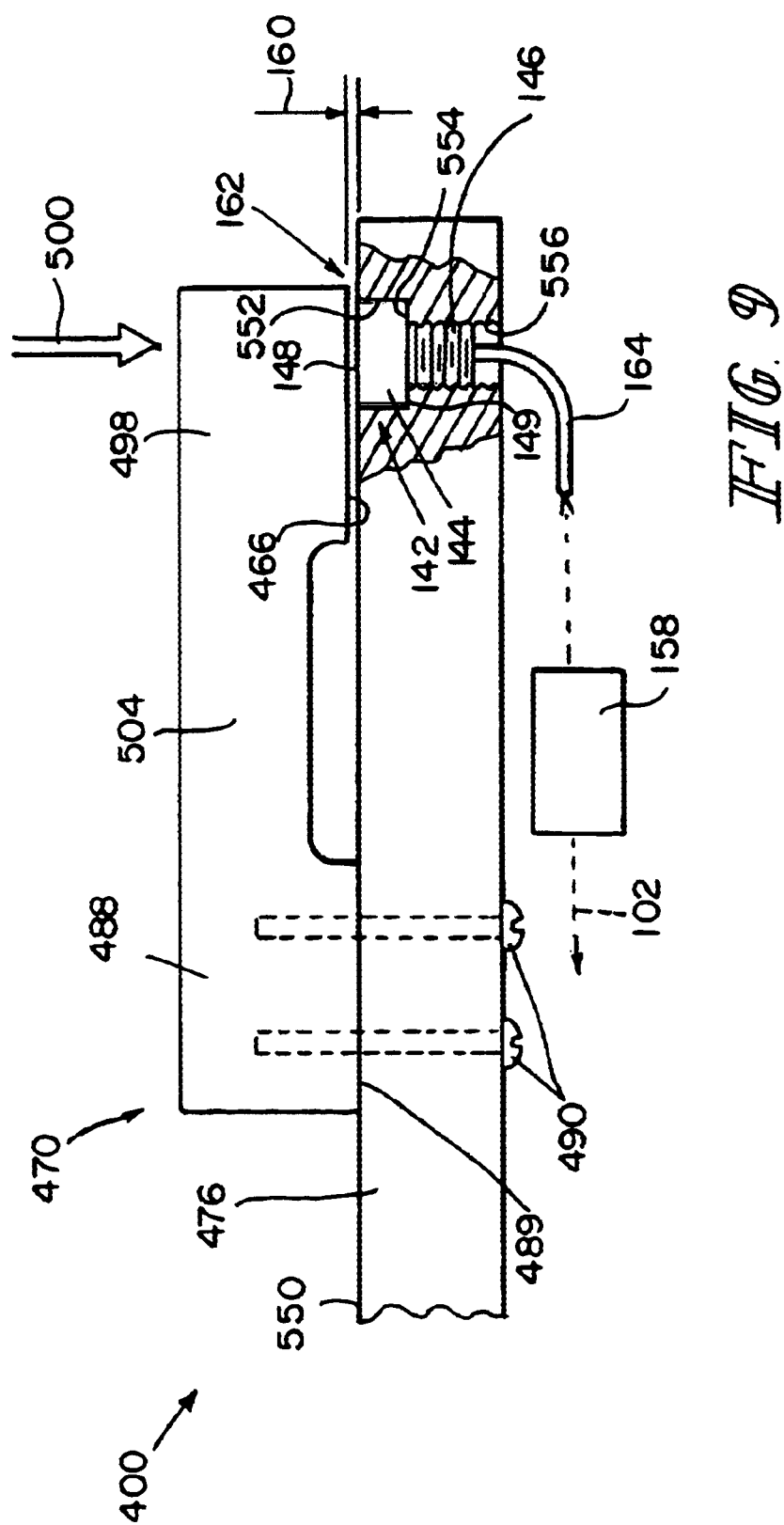
FIG. 9 is a view similar to FIG. 6 of an alternative load cell apparatus showing a cell block mounted to a structure, a transducer mounted to the structure, and the transducer having an end face that confronts a portion of the cell block.

Structure 476 includes a includes a planar surface 550 and a cylindrical bore 552 that is open at planar surface 550 as shown in FIG. 9. Structure 476 also includes an annular shoulder surface 554 and a threaded bore 556 that is open at shoulder surface 554. Threaded portion 146 is received in threaded bore 556 to couple transducer 142 to structure 476. Sensing head 144 is positioned to lie in cylindrical bore 552 so that back side 149 of sensing head 144 abuts shoulder surface 554. Sensing head 144 has a diameter that is substantially the same as the diameter of cylindrical bore 552. Thus, sensing head 144 substantially fills bore 552. However, a very minimal amount of clearance exists between the cylindrical surface of sensing head 144 and the cylindrical surface structure 476 that defines bore 552. The alternative ways in which transducer 142 may be coupled to block 70, as described above, are applicable as well to the ways in which transducer 142 may be coupled to structure 476.

Wires 164 extend from threaded portion 146 and are routed out of threaded bore 556 to electric circuit 158. Electric circuit 158 associated with load cell apparatus 400 is mounted either to structure 476 or to some other structural element. In the illustrative embodiment, the depth of cylindrical bore 552 below planar surface 550 is such that end face 148 of sensing head 144 is substantially coplanar with planar surface 550 of structure 476. In some alternative embodiments, end face 148 is recessed slightly below surface 550, and in other alternative embodiments, end face 148 is situated slightly above surface 550. Each of these arrangements is considered to be within the scope of the phrase "substantially coplanar." In further alternative embodiments, bore 552 is omitted and sensing head 144 is not recessed into structure 476.

In the various illustrative embodiments, transducer 142 is a linear proximity sensor which is based on shaped electromagnetic field (SEF) technology. Such transducers 142 are available from MTS Systems Corporation, Sensors Division, located in Cary, N.C. Therefore, according to this disclosure transducer 142 uses electromagnetics to measure distance 160. This type of sensor is neither resistive, nor capacitive, nor inductive, nor magnetostrictive in nature.

SEF sensors have a high degree of linearity and are insensitive to outside electromagnetic interference because the sensor's electromagnetic field is concentrated in the work area. Because none of the components of SEF sensors are made from ferrite, errors in distance measurements are very low, on the order of 0.00011 inches (0.00028 cm) over a temperature range of −10 degrees Celsius to 75 degrees Celsius. Furthermore, SEF sensors are well suited for applications where the size of gap to be measured is in the range of about 0 to about 5 millimeters. The repeatability of some SEF sensors have been found to be better than 1 micrometer (i.e. 0.0000394 inches) and a typical resolution has been found to be about 0.064 micrometers (0.0000025 inches). Thus, SEF sensors provide high precision linear proximity measurement. It will be appreciated that other types of transducers may be used in load cell apparatus in accordance with this disclosure so long as such sensors have operating characteristics that are acceptable for the particular application.

Those skilled in the art will appreciate that, although load cell apparatus 100, 200, 300 are described herein as being used in a weigh system of a hospital bed 10, it is within the scope of this disclosure for load cell apparatus 100, 200, 300 to be used in any applications where loads are sensed and, in such applications, load cells 100, 200, 300 could be coupled to any type of structure or support. Therefore, the term "structure" as used in the claims is intended to be non-limiting and to mean any and all types of frames, bases, structures, supports, pedestals, decks, masses, etc. In addition, although load cell apparatus 100, 200, 300, 400 described herein include cell blocks 70, 370, 470, as the case may be, those skilled in the art will appreciate that other types of cell blocks, load beams, or load members may be used in lieu of cell blocks 70, 370, 470. Therefore, the term "cell block" as used in the claims is intended to mean load members of all types and of all shapes.

Although the invention has been described in detail with reference to certain illustrated embodiments, variations and modifications exist within the scope and spirit of the invention as described and as defined in the following claims.

What is claimed is:

1. A load cell apparatus for use with a structure, the load cell apparatus comprising
   a cell block that flexes in a first direction relative to the structure in response to an applied load, and
   a transducer coupled to only one of the cell block and the structure, the transducer being adapted to measure a distance across an open gap defined between the transducer and the other of the cell block and the structure, the transducer emitting a beam of electromagnetic energy in a direction substantially parallel to the first direction.

2. The load cell apparatus of claim 1, wherein the cell block is adapted to couple to the structure.

3. The load cell apparatus of claim 2, wherein the structure provides a target surface and the transducer emits electromagnetic energy toward the target surface.

4. The load cell apparatus of claim 1, wherein the transducer includes an end face that faces the structure.

5. The load cell apparatus of claim 1, wherein the cell block includes a planar surface and the transducer includes an end face that is substantially coplanar with the planar surface.

6. The load cell apparatus of claim 5, further comprising a stud extending from the cell block along an axis that is parallel with the planar surface.

7. The load cell apparatus of claim 6, wherein the cell block includes an end surface, the stud extends from the end surface, and the end surface is substantially perpendicular to the planar surface.

8. The load cell apparatus of claim 1, further comprising an electric circuit, the transducer generating an output signal that corresponds to the distance across the gap, and the output signal being processed by the electric circuit.

9. The load cell apparatus of claim 8, wherein the electric circuit is coupled to the cell block.

10. The load cell apparatus of claim 8, wherein the electric circuit generates a processed signal that corresponds to the load being applied to the movable portion of the cell block.

11. The load cell apparatus of claim 1, wherein the transducer produces a shaped electromagnetic field.

12. The load cell apparatus of claim 1, wherein the transducer emits electromagnetic energy into the gap.

13. A load cell apparatus for use with a structure, the load cell apparatus comprising a cell block that flexes in response to an applied load, and a transducer being adapted to measure a distance across a gap defined between the transducer and the structure, the cell block being formed to include a threaded bore and the transducer includes a threaded portion received in the threaded bore.

14. The load cell apparatus of claim 13, wherein the transducer includes a sensing head, the threaded portion includes a passage therethrough, and the transducer includes a wire extending from the sensing head and through the passage.

15. The load cell apparatus of claim 14, wherein the threaded portion has a first diameter, the sensing head has a second diameter, and the second diameter is larger than the first diameter.

16. A load cell apparatus for use with a structure, the load cell apparatus comprising
a cell block having a first portion that is adapted to couple to the structure and a second portion that is spaced apart from the structure, an open gap being defined between the second portion and the structure, the second portion being movable toward the structure to decrease the gap in response to a load applied in a first direction, and
a transducer configured to sense a distance across the gap, the transducer being coupled to only one of the cell block and the structure, the transducer emitting a beam of electromagnetic energy in a direction substantially parallel to the first direction.

17. The load cell apparatus of claim 16, wherein the first portion of the cell block is adapted to abut the structure.

18. The load cell apparatus of claim 16, wherein the transducer includes a planar end face and the second portion of the cell block includes a planar surface that is substantially parallel with the planar end face.

19. The load cell apparatus of claim 16, further comprising an electric circuit, the transducer generating an output signal that corresponds to the distance across the gap, and the output signal being processed by the electric circuit.

20. The load cell apparatus of claim 19, wherein the electric circuit generates a processed signal that corresponds to the load being applied to the movable portion of the cell block.

21. The load cell apparatus of claim 16, wherein the transducer produces a shaped electromagnetic field.

22. The load cell apparatus of claim 16, wherein the transducer emits electromagnetic energy into the gap.

23. A load cell apparatus for use with a structure, the load cell apparatus comprising a cell block having a first portion that is adapted to couple to the structure and a second portion that is spaced apart from the structure, a gap being defined between the second portion and the structure, and a transducer configured to sense a distance across the gap, the transducer including a threaded portion that is adapted for receipt in a threaded hole formed in the structure.

24. The load cell apparatus of claim 23, wherein the transducer includes a sensing head, the threaded portion includes a passage therethrough, and the transducer includes a wire extending from the sensing head and through the passage.

25. The load cell apparatus of claim 24, wherein the threaded portion has a first diameter, the sensing head has a second diameter, and the second diameter is larger than the first diameter.

26. A load cell apparatus for use with a structure, the load cell apparatus comprising
a cell block supported with respect to the structure, the cell block deflecting under application of a load in a first direction, an open gap being defined between the cell block and the structure, and
means for measuring a distance across the gap, the measuring means being coupled to only one of the cell block and the structure, the measuring means emitting a beam of electromagnetic energy in a direction substantially parallel to the first direction.

27. The load cell apparatus of claim 26, wherein the measuring means is coupled to the cell block.

28. The load cell apparatus of claim 26, wherein the measuring means is coupled to the structure.

29. A load cell apparatus comprising two elements defining an open gap therebetween, at least one of the elements being deflectable under a load applied in a first direction to vary the gap, and a transducer for measuring the gap that changes in response to the load, the transducer being coupled to only one of the two elements, the transducer emitting a beam of electromagnetic energy in a direction substantially parallel to the first direction.

30. The load cell apparatus of claim 29, wherein the transducer includes an end face that faces the gap.

31. The load cell apparatus of claim 29, wherein the transducer measures the gap using shaped electromagnetic field technology.

32. A load cell apparatus comprises two elements defining an open gap therebetween, at least one of the elements being deflectable under a load applied in a first direction to change the size of the gap, and a transducer is positioned and configured to measure the size of the gap change in response to the load, the transducer is coupled to only one of the two elements, the transducer emits a beam of electromagnetic energy in a direction substantially parallel to the first direction.

* * * * *